United States Patent [19]

Herrmann et al.

[11] Patent Number: 5,096,973
[45] Date of Patent: Mar. 17, 1992

[54] ABC BLOCK COPOLYMERS BASED ON BUTADIENE, ISOPRENE AND STYRENE, PROCESS FOR THEIR PRODUCTION AND THEIR USE

[75] Inventors: Christoph Herrmann, Marl; Walter Hellermann, Dorsten; Hans-Bernd Fuchs, Marl; Karl-Heinz Nordsiek, Marl; Juergen Wolpers, Haltern, all of Fed. Rep. of Germany

[73] Assignee: Huels Aktiengesellschaft, Marl, Fed. Rep. of Germany

[21] Appl. No.: 593,275

[22] Filed: Oct. 1, 1990

Related U.S. Application Data

[63] Continuation of Ser. No. 300,939, Jan. 24, 1989, abandoned.

Foreign Application Priority Data

Feb. 13, 1988 [DE] Fed. Rep. of Germany ....... 3804547

[51] Int. Cl.$^5$ ............ C08F 297/04; C08L 9/00; C08J 3/24
[52] U.S. Cl. ........................ 525/314; 525/271; 525/931; 525/258; 525/259; 525/95; 524/571; 524/577
[58] Field of Search ........................................... 525/314

[56] References Cited

U.S. PATENT DOCUMENTS 4,814,386  3/1989  Hellermann et al. ............... 525/314

FOREIGN PATENT DOCUMENTS 0054440  6/1982  European Pat. Off. ............ 525/314

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

An unsaturated, elastomeric ABC block copolymer comprised of the monomer units of 40 to 80% of 1,3-butadiene, 5 to 40% of isoprene and 2 to 30% of styrene, said copolymer comprising i) 40 to 75% of block A which contains styrene and butadiene units or isoprene and butadiene units with a content of distributed vinyl or isopropenyl groups of less than 15%, iia) up to 25% of a block B which contains styrene and butadiene units or isoprene and butadiene units with a vinyl or isopropenyl content of more than 70%, or iib) up to 25% of a block B' which contains styrene, isoprene and optionally butadiene units with a content of homogeneously distributed isopropenyl or vinyl groups of less than 15%, and iii) 20 to 55% of a block C which contains styrene and isoprene units and optionally butadiene units with an isopropenyl or vinyl content of more than 70%.

5 Claims, No Drawings

ABC BLOCK COPOLYMERS BASED ON BUTADIENE, ISOPRENE AND STYRENE, PROCESS FOR THEIR PRODUCTION AND THEIR USE

This application is a continuation of applicaton Ser. No. 07/300,939, filed on Jan. 24, 1989, now abandoned.

BACKGROUND OF THE INVENTION

1. Field of the Invention

The present invention relates to unsaturated elastomeric ABC block copolymers based on butadiene, isoprene and styrene, their production, and their use for the manufacture of tire treads.

2. Description of the Background

It is known that rubbers which are employed in the manufacture of tires are subject to the following demands:

The cold flow of the rubber should be as low as possible;

The rubbers should be readily processable in the subsequent mixing processes;

The rubbers should be free-flowing in molding processes;

The rubbers should be readily vulcanizable.

Further, demands in tire manufacture arise from their field of use. As is known, improvements in the properties of tire treads are in demand.
  a) Tires surfaces should be highly elastic, even at low temperatures.
  b) Tires surfaces should have a good grip in wet condition.
  c) Tires surfaces should have high abrasion resistance and accordingly a long service life.
  d) Tires surfaces should generate as little heat as possible on dynamic load. Their rolling resistance should be as low as possible so that the fuel consumption of the vehicle is as low as possible.

It is known that, when tested in the torsion pendulum test, rubbers exhibit a temperature dependency of the logarithmic decrement of the mechanical damping which corresponds, when presented in the form of a graph, to a curve which is characteristic of the particular rubber. The demands desired on the tire treads arise preferentially when the damping curve has the broadest possible vibration-damping range (cf. K. H. Nordsiek, Kautschuk und Gummi, Kunststoffe 38, 178 (1985) and 39, 599 (1986).

It is also known that the properties of the tire treads, some of which are partly mutually conflicting, are determined to a very considerable extent by the type and composition of the rubbers employed for this purpose. Homopolymers based on the monomeric raw materials usually employed, such as butadiene, isoprene and styrene, still fail to fulfill these conditions satisfactorily (cf. EP-OS 0,054,204 and JP-OS 82/87,4061 ).

In practice, blends of rubber varieties have the disadvantage that the range of properties mentioned is not achieved and the tire quality desired is not reproduced reliably. There is, therefore, a demand for rubbers which, as far as possible, approach the property expectations given above. This aim should in principle be achievable by means of rubbers which comprise polymers containing different blocks.

For the purposes of this invention, blocks of a polymer should be regarded not only as chain segments comprising different monomer components, but also segments which differ, as a consequence of the external process parameters, in the type of linking of the monomer components or in the proportion in which they are incorporated into a chain segment.

Although the butadiene-isoprene copolymer described in EP-OS 0,054,204 has different contents of isoprene in its initial and terminal parts, which is attributable to the low polymerization tendency of isoprene compared with butadiene, it cannot be regarded as a block copolymer in the sense described above. Even if the proportion of styrene is altered during the copolymerization of dienes and styrene (cf. DE-OS 3,108,583), it is not a block copolymer which is obtained, but rather a polymer having gradual transitions. The desired improvement in tire properties is also still inadequate here. DE-OS 3,108,583 describes single-phase rubber systems having a damping maximum caused by a glass transition temperature in a very narrow temperature range. An improvement, however, is not achieved until a copolymer comprising two different blocks A and B is prepared which differ in structure and/or composition. Thus, for example, DE-OS 3,151,139 describes a random styrene-butadiene block copolymer. The blocks differ in their butadiene content and in the content of vinyl bonds. They are mixed with one another in a manner such that they are compatible and such that the two separate damping peaks are replaced by only one.

In DE-OS 3,530,438, rubber compounds are claimed which contain at least 20% of a styrene-butadiene block copolymer. The blocks differ in their styrene contents, in their contents of vinyl bonds and, as a consequence, in the glass transition temperatures. In this case too, the damping curve has only a narrow temperature range of maximum damping.

Japanese Laid Open Application 83/122,907 describes branched rubbers which can be obtained by reacting, for example, a metallic tetrahalogen compound such as $SnCl_4$ with block copolymers comprising a polyisoprene block and a polybutadiene block. Each of the two blocks thus is a homopolymer. The star-shaped rubber obtained after reaction with the metallic coupling agent forms a single-phase rubber system having a glass transition point.

British Patent 2,090,840 describes block copolymers which are obtained by polymerization of dienes or copolymerization of diene mixtures, wherein the blocks differ by 20 to 50 mol-% in the content of 1,2 and/or 3,4 structural units. Block copolymers of this type are produced in the presence of various amounts of cocatalyst or at various temperatures.

EP-OS 0,173,791 describes tread materials whose rubber component may comprise 30 to 100% of block copolymers based on butadiene, isoprene and, if appropriate, styrene and/or piperylene. The block copolymers are produced in the presence of cocatalysts while increasing the temperature and may, for example, have an ABC structure. The polymers always contain an end block based on butadiene which is produced at increasing temperature and consequently has a comparatively high proportion of 1,2 structural units and an inhomogeneous distribution of vinyl groups. These block copolymers again fail to produce damping curves which exhibit a sufficiently broad plateau which is necessary to produce all tire properties in an ideal manner (see comparative experiment A). For this reason, it has already been proposed in that application to blend the block copolymers obtained with other rubber components (see claim 1 and Example 2).

All the block copolymers described above are unsatisfactory for at least one of the following reasons:
1. The block copolymers do not satisfy the abovementioned demands of a tire material;
2. Problems occur in the compatibility of the two blocks;
3. The damping curve has only a narrow damping maximum;
4. Large amounts of comparatively expensive isoprene are necessary.

A need continues to exist for a rubber material of improved properties as the rubber for the tire treads.

SUMMARY OF THE INVENTION

Accordingly, one object of the present invention is to provide an ABC block copolymer based on butadiene, isoprene and styrene which has a broad vibration damping curve.

Another object of the invention is to provide an ABC block copolymer which has a vibration damping curve ranging from −90° C. to +30° C.

Briefly, these objects and other objects of the present invention as hereinafter will become more readily apparent can be attained by an ABC block copolymer comprising 40 to 80% of 1,3-butadiene, 5 to 40% of isoprene and 2 to 30% of styrene, said copolymer comprising
i) 40 to 75% of block A which contains styrene and butadiene units or isoprene and butadiene units with a content of distributed vinyl or isopropenyl groups of less than 15%,
iia) up to 25% of a block B which contains styrene and butadiene units or isoprene and butadiene units with a vinyl or isopropenyl content of more than 70%, or
iib) up to 25% of a block B' which contains styrene, isoprene and optionally butadiene units with a content of homogeneously distributed isopropenyl or vinyl groups of less than 15%, and
iii) 20 to 55% of a block C which contains styrene and isoprene units and optionally butadiene units with an isopropenyl or vinyl content of more than 70%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 and 2 are Schmieder-Wolf torsiograms of vulcanized rubber test specimens.

DETAILED DESCRIPTION OF THE PREFERRED EMBODIMENTS

The proportion of butadiene units in block A is preferably 70 to 95%, while the proportion of butadiene units in the block B is preferably 50 to 90%. The ABC block copolymers may be either linear or branched. The branching can be achieved with the aid of a branching agent during the polymerization or with the aid of a coupling agent at the end of the polymerization.

The process for the production of the block copolymers by anionic polymerization of the monomers in an inert organic solvent in the presence of an organolithium compound and a cocatalyst involves a first step of initially producing a block A by polymerizing butadiene and styrene or butadiene and isoprene in the appropriate relative amounts in the absence of a cocatalyst until all monomer is copolymerized to form the block A component. A block B is then produced by adding a cocatalyst and continuing the polymerization. The still-missing third monomer from the group comprising butadiene, isoprene and styrene is subsequently added so that the appropriate relative amounts of reacting monomer ingredients are present and the polymerization of the block B monomer mixture is completed. The polymerization of the block C can alternatively be carried out using a freshly prepared monomer mixture which must contain isoprene and styrene and may additionally contain butadiene in the appropriate relative amounts and polymerization is continued until all of the monomer is copolymerized.

Alternatively, it is possible to produce a block B' by adding the still-missing third monomer selected from the group of butadiene, isoprene and styrene and continuing the polymerization until completion of the block B' stage. The block C is then introduced along with the addition of a cocatalyst. It is possible to simultaneously add a further monomer from the group comprising butadiene, isoprene and styrene.

For the present process and the polymers obtainable therefrom, the following criteria are essential:

I. The block A always contains two monomers which are butadiene and isoprene or butadiene and styrene. It is in this aspect that the ABC block copolymers differ significantly from similar polymers described in German Patent Application P 3,710,002, which describes ABC block copolymers based on butadiene and isoprene, a process for their production and their use.

II. The block A contains a small number of alkenyl side groups. In the case where the block A is obtained by polymerization of butadiene and styrene, the vinyl content is less than 15 per cent by weight. In the case where the block A is obtained by polymerization of butadiene and isoprene, the total vinyl and isopropenyl content is less than 15 per cent by weight.

III. It is known that the three monomers butadiene, isoprene and styrene have different reactivities and consequently, even when employed in equimolar amounts, are in most cases incorporated into the polymer in different amounts at the beginning of polymerization. Regardless of this, the vinyl and isopropenyl groups are preferably distributed homogeneously over the butadiene and isoprene units present. This applies to all three blocks.

IV. It is essential that the central block is introduced by adding a cocatalyst or by adding the third monomer. This consequently means, for example, that styrene is added after the polymerization of a mixture of butadiene and isoprene. It is also possible for the proportion of butadiene or isoprene to be modified. In practice, a procedure is usually followed in which the polymerization of the block A starts from the very outset with a relatively large amount of monomers and only the third monomer is added at the beginning of the polymerization of block B'. It is, however, also possible to initiate polymerization of the block B' by means of a freshly added monomer mixture.

V. Depending on whether a block B or a block B' has been produced, there are two different ways of producing the block C. This block contains a high proportion of vinyl and isopropenyl units. The presence of butadiene is optional.

Another process of forming an ABC block copolymer suitable for use in the manufacture of the tire treads is as follows:

The reaction medium employed is an inert organic solvent. Particularly suitable are hydrocarbons having 6 to 12 carbon atoms such as pentane, hexane, heptane, octane and decane, and the cyclic analogues thereof. Aromatic solvents, such as, for example, benzene, toluene, xylenes, inter alia, are also suitable. It is of course also possible to employ mixtures of the above-described solvents.

The catalysts employed are alkyllithium compounds, which are readily prepared by reacting lithium with the appropriate alkyl halides. The alkyl radicals have 1 to 10 carbon atoms. Individual hydrogen atoms may be substituted by phenyl radicals. Suitable alkyllithium compounds include methyllithium, ethyllithium and pentyllithium; n-butyllithium is preferred.

In order to improve the cold flow of the block polymer product, at least one polymerization step is advantageously conducted in the presence of small amounts of a branching agent such as, for example, divinylbenzene (DVB). A maximum of 0.5 parts of DVB are employed, relative to 100 parts of monomer. Addition of this branching agent is superfluous if coupling is proposed after the polymerization.

The nature and quantity of the catalyst and branching agent are generally selected so that the block copolymer obtained has the following properties: Mooney viscosity ($ML_{1-4}$, 100° C., DIN 53 523): 35 to 120; Non-uniformity $U=(Mw/Mn)-1$, determined by gel-permeation chromatographic analysis (GPC analysis): 0.6 to 3.0; Deformation elasticity (80° C.), DIN 53 514): $\geq 20$.

In the present process, individual blocks may be prepared in the absence of a cocatalyst, while others may be prepared in the presence of a cocatalyst. In the former case, that is, in the absence of a cocatalyst, the process is carried out at temperatures from 20 to 120° C., preferably 20 to 80° C., and, in the case of dienes, polymers are obtained which contain more than 85% of 1,4 structural units of the formula

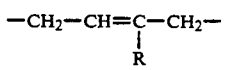

wherein R is H (butadiene) or methyl(isoprene).

In the second case, the intention is to obtain polymers having the highest possible proportion of 1,2 and/or 3,4 structural units.

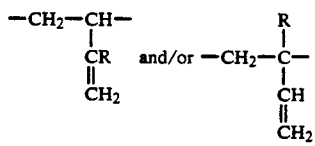

wherein R is hydrogen (butadiene) or methyl(isoprene).

The choice of cocatalysts and the amounts in which they are employed therefore depend on their ability to regulate the microstructure, i.e. to control the course of the polymerization with respect to a fullest possible formation of 1,2 and/or 3,4 structural units. The cocatalyst is generally selected from the group of ethers, tertiary amines and ether-containing tertiary amines. Suitable ethers include, in particular, dialkyl ethers of ethylene glycol and diethylene glycol, whose alkyl groups each have up to 4 carbon atoms.

In particular in the production of branched block copolymers, preferred ethers are those of the formula:

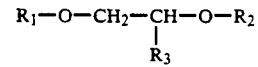

wherein $R_3$ represents hydrogen or a methyl or ethyl group and $R_1$ and $R_2$ are each alkyl radicals, having different numbers of carbon atoms, selected from the group of methyl, ethyl, n- and isopropyl and n-, iso-, sec.- and tert.-butyl, and the sum of the carbon atoms in the two alkyl radicals is 5 to 7. Suitable tertiary amines include, for example, N,N,N',N'-tetramethylethylenediamine, N,N,N',N'-tetraethylethylenediamine and triethylenediamine. Suitable ether-containing amines include N-methylmorpholine and N-ethylmorpholine.

The cocatalyst is employed in a ratio of 2:1 to 30:1, in particular 2:1 to 15:1, relative to the number of moles of the catalyst. At elevated temperatures, larger amounts of cocatalyst are generally required to achieve the microstructure regulation desired. Reaction temperatures of 100° C. should not be exceeded. The polymerization is expediently carried out at constant temperature. It is also possible to work at increasing or decreasing temperature; however, in this ease care should be taken that the microstructure is not fundamentally changed.

Steps must be taken by suitable measures, to ensure that the content of polystyrene blocks in the ABC block copolymer does not exceed 2% by weight. (A method of determining the content of polystyrene blocks is given in the standard work Houben-Weyl "Methoden der Organischen Chemie", Volume 14/1 (1061), page 698.) It is also possible to add some of the styrene to the block C towards the end of the polymerization.

It is known that some of the compounds proposed as cocatalysts have the property of suppressing formation of polystyrene blocks. The same property is possessed by compounds which are known as randomizers and are usually potassium salts of alkoxides and organic carboxylic and sulfonic acids.

In a particular embodiment of the process, the "living polymers" present after completion of the polymerization are reacted with a coupling agent to form branched or star-shaped block copolymers. Suitable coupling agents include polyepoxides such as epoxidized linseed oil, polyisocyanate, polyketones such as hexane-1,3,6-trione, polyanhydrides such as, for example, the dianhydride of pyromellitic acid, and dicarboxylates such as dimethyl adipate. Particularly suitable are the tetrahalides of the elements Si, Ge, Sn and Pb, in particular $SiCl_4$; organic compounds of the formula: $R_n[SiHal_3]_n$ where n=1 to 6, in particular n=1 and 2 and R is an n-valent organic radical, for example, an aliphatic, cycloaliphatic or aromatic radical; organic compounds which contain at least one $SiHaL_2$ group such as, for example, dimethylsilyl chloride; halosilane hydrides of the formula:

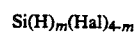

where $3 \geq m \geq 1$; and di- and trivinylbenzenes such as, for example, 1,4-divinylbenzene. Examples of compounds of the formula $R_n[SiHal_3]_n$ include 1,2,4-tris(2-trichlorosilylethyl)-cyclohexane, 1,8-bis(trichlorosilyl)-octane and 1-(trichlorosilyl)-octane;

The process can be carried out either batchwise or continuously, and must, of course, be conducted in a non-oxidizing atmosphere such as nitrogen or an inert gas. Normally, the polymerization reaction is conducted under a positive pressure in a suitable pressure vessel in view of the reaction temperatures employed and the fact that the reaction medium at least contains the relatively low boiling butadiene as a reactant.

With the aid of the damping curve, those skilled in the art are in a position, by varying the reaction conditions, to produce block copolymers which can be processed into tire running surfaces having the property combinations desired.

The amorphous polymers obtained, if they are to be processed into vulcanizates, are mixed with active, reinforcing fillers, a vulcanization agent and customary additives. In general, it is necessary to carry out this mixing under the action of shear forces.

Compounds which are intended for the production of tire treads are generally shaped into green tread strips. During homogenization and shaping, which can be effected, for example, in an extruder, the temperature and time conditions can be selected so that vulcanization does not occur.

The rubber component in the vulcanizable compounds comprises, for example, 70 to 100% by weight of a block copolymer of the invention and 0 to 30% by weight of a rubber selected from the group of known, amorphous multipurpose rubbers such as, for example, styrene-butadiene rubber, 1,4-cis-polybutadiene, 1,4-cis-polyisoprene and natural rubber.

Suitable additives for the rubber include reinforcing fillers such as, for example, tire running surface carbon blacks of various activity, highly disperse silicic acids which have optionally been treated with silane adhesion promoters, and mixtures thereof.

Conventional vulcanizing agents can be added which contain, for example, sulfur in combination with accelerators. The amount of the vulcanizing agent depends on the other components in the vulcanizable compound and can be determined by simple, preliminary experiments.

Other additions which can be added include the plasticizer oils which are customary in rubber technology, preferably aromatic, aliphatic and naphthenic hydrocarbons, and customary auxiliaries such as, for example, zinc oxide, stearic acid, resin acids, antiaging agents and ozone-protection waxes, in customary amounts. A typical, but non-limiting vulcanization mixture, could contain 100 parts of rubber; 45-70 parts, preferably 50 parts by weight carbon black; 0-20 parts, preferably 10 parts by weight, of highly aromatic oil; 2 to 4 parts, preferably 3 parts by weight, zinc oxide; 1 to 5 parts. preferably 2 parts by weight stearic acid; 0.1 to 2.5 parts by weight sulfur and 0.4 to 4 parts by weight of an accelerator.

The block copolymers of to the present invention are suitable for the production of the tire treads of car and truck tires, and can be used both for the production of new tires and for re-treading used tires.

The tire treads are distinguished, in particular, by the following advantageous properties:
road surface gripping capability when wet;
high abrasion resistance;
low rolling resistance and therefore low fuel consumption;
high wear resistance; and
all-weather properties.

Having generally described this invention, a further understanding can be obtained by reference to certain specific examples which are provided herein for purposes of illustration only and are not intended to be limiting unless otherwise specified.

The following are considerations about procedural aspects of the Examples.

Suitable solvents employed in the polymerization reactions were hydrocarbon mixtures comprising up to about 50% of hexane. Other components of this hydrogenated $C_6$ fraction include, in particular, pentane, heptane and octane, and the isomers thereof. The solvent was removed from the polymerized material by using a flow of nitrogen gas and subsequently drying the polymerized mass over a molecular sieve of pore width 0.4 nm, so that the water content is reduced to below 10 ppm.

The organolithium catalyst employed was n-butyllithium, which, unless otherwise stated, was used in the form of a 15 per cent by weight solution in hexane.

The monomers isoprene and styrene were separated from the stabilizer by distillation and titrated with n-butyl-lithium in the presence of o-phenanthroline.

The glycol ether was titrated with n-butyllithium in the presence of o-phenanthroline.

The divinylbenzene (DVB) employed is a mixture of m- and p-divinylbenzene and was employed in the form of a 64 per cent solution in hexane.

The conversion was determined by determining the solids content after evaporation of the solvent and the monomers.

The coupling yield is regarded as the percentage of rubber which has a star-shaped structure after reaction with a coupling agent and is distinguished by a considerably higher molecular weight compared with the uncoupled rubber.

The determination was carried out using GPC analysis, tetrahydrofuran being employed as the solvent and polystyrene as the column material. The polymers are characterized using a light-scattering detector. For this purpose, samples were taken from the reactor before addition of the coupling agent and at the end of the reaction.

The microstructure was determined by IR spectroscopy. The deformation elasticity DE was determined by the procedure of DIN 53,514.

The non-uniformity U was determined by means of GPC analysis.

EXAMPLE 1

600 parts of hexane (industrial $C_6$ fraction), 63.5 parts of 1,3-butadiene, 13 parts of styrene and 0.02 parts of DVB were introduced into a first V2A stainless steel stirred autoclave which had been flushed with dry nitrogen, and the mixture was titrated with n-butyllithium (BuLI) with thermoelectric monitoring. The polymerization was initiated at 50° C. by adding 0.054 parts of BuLI and kept at a virtually constant rate by cooling. After 50 minutes, a sample was removed, from which the conversion was determined at 79% and whose microstructure was measured (block A).

Immediately thereafter, 1.0 part of diethoxyethane was added. The temperature was kept constant. After 65 minutes, a sample was removed, from which the conversion was determined as 94% and whose microstructure was measured (block A+B).

Immediately thereafter, the contents of a second V2A stainless steel stirred autoclave (T=40°) were added over the course of 2 minutes. The contents were a solution, titrated with BuLi, of 24 parts of isoprene in 50 parts of hexane. The temperature was kept constant.

The conversion was virtually quantitative 2.5 hours after initiation. The solution was terminated by adding 0.5 parts of 2,2'-methylene-bis-(4-methyl-6-tert.-butyl-phenol) -in 2 parts of moist toluene. The solvent was removed by steam distillation, and the polymer was dried for 24 hours at 70° C. in a circulation drying oven.

EXAMPLE 2 to 4

The experimental procedure of Example 1 was employed. The amounts employed and the modified reaction parameters are presented in Table 1.

TABLE 1

|  | Example 2 | Example 3 | Example 4 |
|---|---|---|---|
| Mixture for Block A |  |  |  |
| parts of hexane | 285 | 285 | 600 |
| parts of butadiene | 60 | 55 | 60 |
| parts of isoprene | — | — | 15 |
| parts of styrene | 20 | 15 | — |
| parts of DVB | 0.02 | 0.02 | 0.02 |
| initiation using | 0.051 | 0.055 | 0.05 |
| parts of BuLI |  |  |  |
| Initiation of Block B |  |  |  |
| after minutes | 62 | 110 | 50 |
| conversion (%) | 67 | 82 | 75 |
| by addition of | 0.75 *) | 0.75 *) | 1.0 **) |
| parts of cocatalyst |  |  |  |
| Initiation of Block C |  |  |  |
| after minutes | 127 | 178 | 53 |
| conversion (%) | 96 | 100 | 88 |
| by addition of |  |  |  |
| parts of hexane | 200 | 200 | 50 |
| parts of butadiene | — | 5 | — |
| parts of isoprene | 15 | 15 | 10 |
| parts of styrene | 5 | 10 | 15 |
| termination of the | 4.5 | 5.0 | 2.5 |
| polymerization after hours |  |  |  |

*) 1-tert.-butoxy-2-ethoxyethane
**) 1,2-diethoxyethane
Comparison Example A (EP-OS 0,173,791); page 16, 19, 20.

TABLE 2

Percentage of the structural elements obtained by polymerization of the following monomers

|  | Butadiene | | | Isoprene | | Styrene |
|---|---|---|---|---|---|---|
|  | trans-1,4 | 1,2 *) | cis 1,4 | 3,4 | 1,4 | |
| Example 1 |  |  |  |  |  |  |
| Block A | 50 | 14 | 32 | — | — | 4 |
| Block AB | 40 | 19 | 25 | — | — | 12 |
| Block ABC | 28 | 17 | 20 | 18 | 2 | 14 |
| Example 2 |  |  |  |  |  |  |
| Block A | 47 | 12 | 34 | — | — | — |
| Block AB | 39 | 15 | 24 | — | — | 22 |
| Block ABC | 29 | 12 | 20 | 9 | 3 | 27 |
| Example 3 |  |  |  |  |  |  |
| Block A | 45 | 12 | 34 | — | — | 8 |
| Block AB | 38 | 12 | 29 | — | — | 21 |
| Block ABC | 28 | 11 | 21 | 9 | 4 | 27 |
| Example 4 |  |  |  |  |  |  |
| Block A | 49 | 14 | 33 | 2 | 2 | — |
| Block AB | 47 | 18 | 29 | 4 | 2 | — |
| Block ABC | 28 | 17 | 19 | 13 | 3 | 20 |
| Example 5 |  |  |  |  |  |  |
| Block A | n.d. | n.d. | n.d. | — | — | n.d. |
| Block AB | 43 | 17 | 31 | — | — | 9 |
| Block ABC | 30 | 14 | 24 | 12 | 2 | 18 |
| Comparison | 23 | 34 | 13 | 26 | 5 | — |
| Example A |  |  |  |  |  |  |

*) including 1,2-isoprene
n.d. = not determined

TABLE 3

Characterization of the ABC block copolymers

|  | Example | | | | | |
|---|---|---|---|---|---|---|
|  | 1 | 2 | 3 | 4 | 5 | A |
| Block A (%) | 61 | 53 | 57 | 56 | 56 | n.d. |
| B (%) *) | 11 | 24 | 13 | 10 | 10 | n.d. |
| C (%) *) | 28 | 23 | 30 | 34 | 34 | 15 |
| Mooney-viscosity | 48 | 56 | 72 | 46 | 68 | 76 |
| DE | 21 | 25 | 36 | 21 | 33 | 72 |
| U | 0.9 | 1.1 | 1.6 | 0.8 | 2.2 | 1.3 |
| Coupling yield (%) | — | — | — | — | 77 | — |
| Number of arms | — | — | — | — | 9 | — |

*) calculated from the conversions
n.d. = not determined

FIGS. 1 and 2 show the Schmieder-Wolf torsiograms of vulcanized test specimens, produced analogously to the procedure for the production of SBR in ISO 2322-1985 (E) Series A. It is clear that the torsiograms of the examples of the invention are broader than the torsiogram of comparison example A.

EXAMPLE 5

335 parts of hexane, 60 parts of butadiene and 6 parts of styrene were introduced into a stirred autoclave and titrated with BuL with thermoelectric monitoring. Vulcanization was initiated at 50° C. by adding 0.077 parts of BuLi, and the temperature was kept constant by cooling. After 45 minutes, a sample was removed, and the conversion was 85%. Immediately thereafter, 0.65 parts of 1,2-diethoxyethane were added, and the polymerization was continued at constant temperature. A sample withdrawn after 62 minutes exhibited virtually complete conversion. The contents of a second stirred autoclave (T=50° C.) were then added in the course of 2 minutes. This contained 220 parts of hexane, 7 parts of butadiene, 17 parts of isoprene and 10 parts of styrene. The temperature was kept in the range from 50 to 56° C. by cooling. After 88 minutes, the conversion was complete, and 0.66 parts of DVB were added. After a further 2 hours at 50° C., the polymerization was terminated as under Example 1 and worked up.

Evaluation of the GPC analysis showed that 77% of the polymer is in coupled form. The molecular weight of this polymer is around 9 times greater than that of the uncoupled molecular chains.

Having now fully described the invention, it will be apparent to one of ordinary skill in the art that many changes and modifications can be made thereto without departing from the spirit or scope of the invention as set forth herein.

What is new and desired to be secured by letters patent of the United States is:

1. A method of producing tire treads, comprising:
    forming the running surfaces of the tire treads from an ABC block copolymer comprised of 40-80% of 1,3-butadiene, 5-40% of isoprene and 2-30% of styrene, said copolymer comprising:

(i) 40-75% of block A which contains isoprene and butadiene units with a content of distributed vinyl or isopropenyl groups of less than 15%;
(iia) up to 25% of a block B which contains styrene and butadiene units or isoprene and butadiene units with a vinyl or isopropenyl content of more than 70%, or
(iib) up to 25% of block B' which contains styrene, isoprene and optionally butadiene units with a content of homogeneously distributed isopropenyl or vinyl groups of less than 15%; and
(iii) 20-55% of a block C which contains stryene and isoprene units and optionally butadiene units with an isopropenyl or vinyl content of more than 70%.

2. The method of claim 1, wherein the proportion of butadiene units in block A is 70 to 95%.

3. The method of claim 1, wherein the proportion of butadiene units in block B is 50 to 90%.

4. The method of claim 1, 2 or 3, wherein block C contains 0 to 30% butadiene, 20 to 70% isoprene and 10 to 60% styrene.

5. The method of claim 1, wherein the running surfaces of the tire treads are formed from a rubber component which is a combination of 70 to 100% by weight of said block copolymer with from 0 to 30% by weight of an amorphous rubber selected from the group consisting of stryene-butadiene rubber, 1,4-cis-polybutadiene, 1,4-cis-polyisoprene and natural rubber.

* * * * *